INVENTOR.
DAVID G. LOOMIS

BY Charles Marks

ATTORNEY

United States Patent Office 3,302,821
Patented Feb. 7, 1967

3,302,821
CLOSURE MEANS
David G. Loomis, Montclair, N.J., assignor to Midvale-Heppenstall Company, Philadelphia, Pa., a corporation of Pennsylvania
Filed Feb. 10, 1965, Ser. No. 431,505
8 Claims. (Cl. 220—39)

This invention relates generally to an improved plug which incorporates a large-diameter thread and is particularly concerned with the guidance and support of such plug during its engagement with a pressure vessel. The invention is deemed applicable for use with pressure vessels such as are employed in the art of molding powdered materials, including ceramic, metal and plastic powders, under hydraulic pressure but it is to be understood that the invention may also be employed with other types of pressure vessels.

It has been common practice to avoid large-diameter threads on plugs of pressure vessels wherever possible despite their seeming simplicity. Thus, where plugs incorporating such threads exceed more than a few inches in diameter, an excessively large wrench may be required to effect a torque sufficient for their opening and closure and, if they should become immobile by reason of galling or corrosion, it may become extremely difficult or impossible to manipulate them without accomplishing their destruction.

Nevertheless, in many instances, a large-diameter threaded plug represents the simplest and most efficient closure means available and this is particularly so in the case of various types of pressure vessels. In such applications, however, it has often been found necessary to resort to difficult and expensive machining operations aimed at removal of a portion of the thread so as to form a so-called "breech thread" but an additional length of thread must be provided to compensate for such removal, thereby resulting in a heavier plug.

The present invention is aimed at solving these problems. More specifically, it is an object of the present invention to provide an improved, large-diameter threaded plug which is easily manipulable during its engagement and disengagement with the member with which it is intended to be used.

Another object of the invention is to provide a plug of the character described which is easily aligned for operative use and whose engagement and disengagement can be accomplished with a minimum of frictional resistance.

Another object of the invention is to provide an improved means for guiding such a plug into and out of operative engagement with an aperture in a pressure vessel.

A further object of the invention is to provide an improved means for supporting such a plug within the aperture so as to avoid mechanical seizure or injury of the adjacent elements of the plug and aperture.

A further object of the invention is to provide means whereby a plug of the character described may be rapidly inserted into and removed from an aperture in a pressure vessel.

Other objects and advantages of the present invention will become apparent from the following discussion when read in connection with the accompanying drawings.

In the drawings.

Throughout the various views, similar numerals are employed to refer to similar parts of the illustrated form of the invention.

Figure 1:
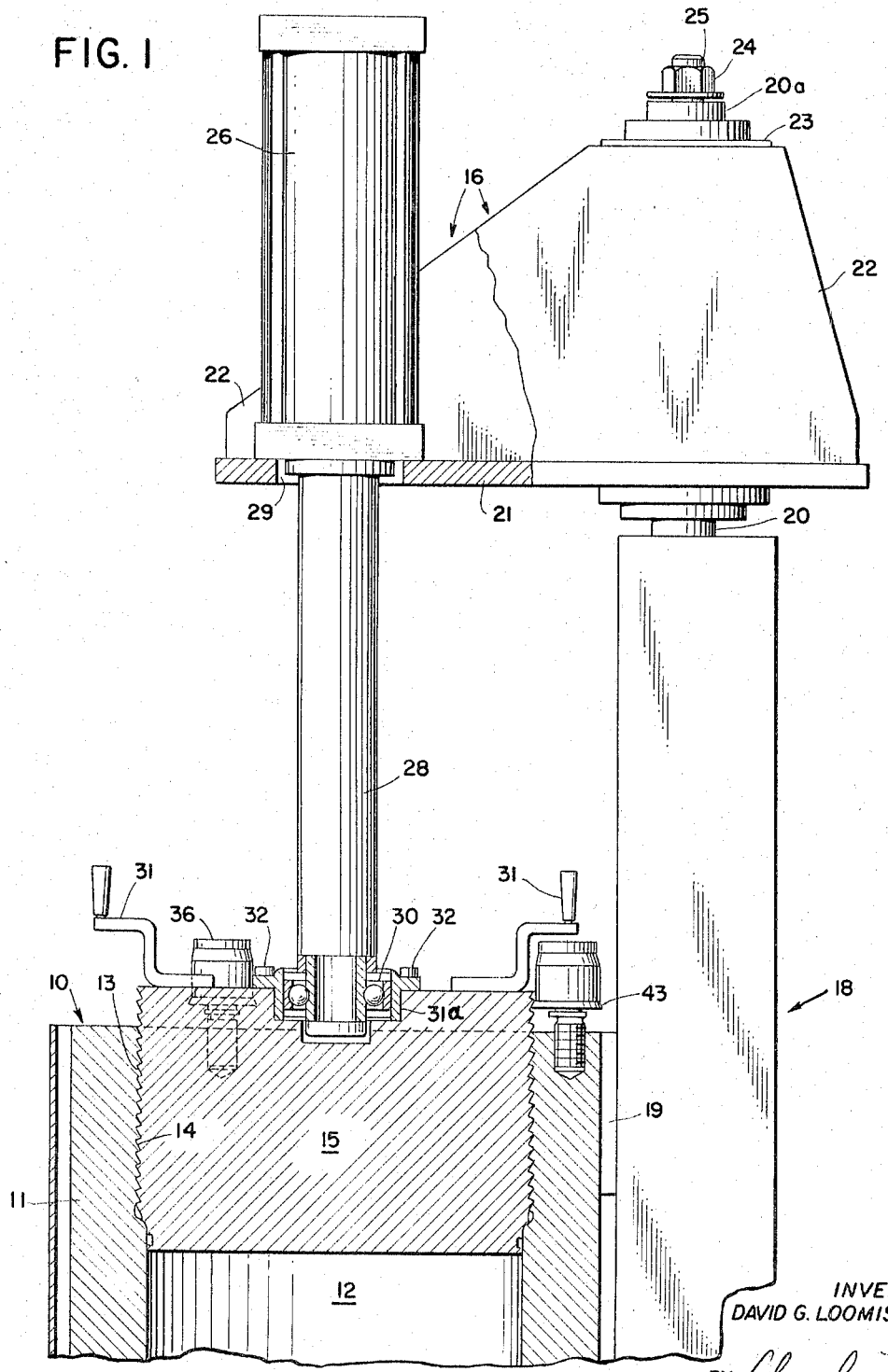
FIGURE 1 is a fragmentary, partially cross-sectioned elevational view of one embodiment of my invention.

The present invention utilizes means for guiding and supporting a threaded plug in the threaded aperture of a pressure vessel in a manner that permits the threaded elements to be disposed in a spaced relation when the vessel is unpressurized but wherein they are urged into contact upon pressurization of the vessel, thereby transferring the complete pressure load to the said threaded elements. The invention has been employed to advantage in hydraulically pressurized vessels, such as are employed for the bag molding of powdered materials, where pressures in the order of 15,000 p.s.i. are encountered. It is to be understood, however, that the invention may be employed in other types of pressure vessels as well.

A more complete understanding of the invention can be gained from the following discussion. Thus, as may be seen in FIGURE 1 of the drawings, one embodiment of the invention comprises a generally cylindrical pressure vessel, generally designated by the numeral 10 and including a wall 11 which defines a pressure chamber 12 and a vertical aperture located at the upper portion of the pressure vessel 10. This aperture is provided with an internal thread 13 which, in the manner hereinafter described, accommodates the external thread 14 of a plug 15.

The advantages of the invention are such that the plug 15 may be extremely heavy and of large diameter. For example, it has been found in practice that the plug may be composed of steel and may have a diameter in the order of two feet, a height in the order of 15 inches and a weight in the order of 1900 pounds. However, the invention is not limited to the employment of such a plug and it is to be understood that plugs of other sizes, weights and materials may also be employed.

In the form of the invention herein described, the plug is suspendable from an arm 16 disposed above the pressure vessel 10 and depending from an upright stanchion, generally designated by the numeral 18. The stanchion 18 may be secured to the pressure vessel 10, as by a suitable connecting member 19, and is surmounted by a shaft 20 which supports the arm 16.

Figure 2:
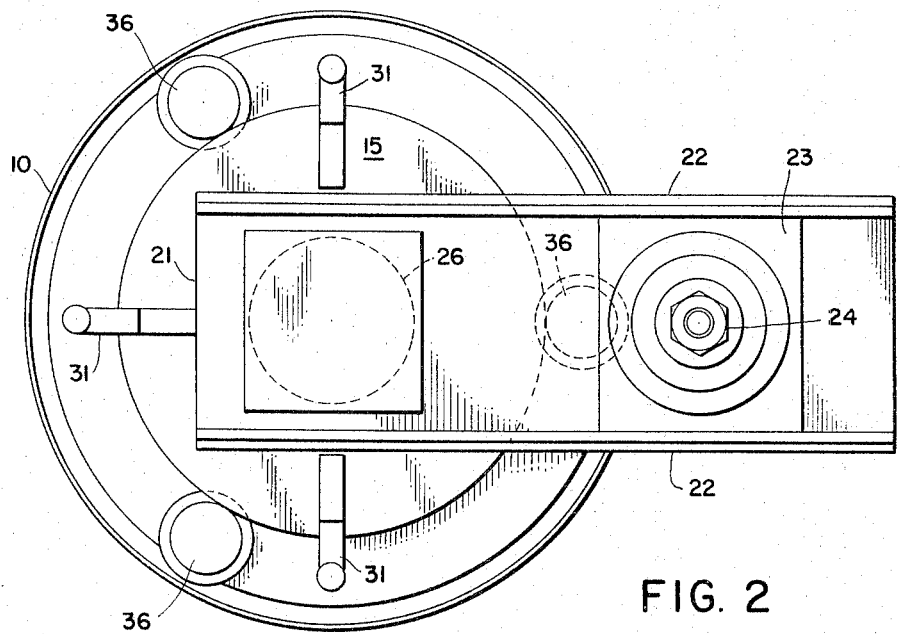
FIGURE 2 is a plan view of the embodiment of the invention depicted in FIGURE 1.

As may be seen in FIGURES 1 and 2, the arm 16 includes a horizontal web 21 provided with a pair of vertical flanges 22, the upper ends of which are connected by a suitable cross-piece 23. The cross-piece 23 seats a nut and washer assembly 24 which is disposed upon an axial extension 25 of the shaft 20, the upper end of which is designated by the numeral 20a.

Pressure-actuated means such as a hydraulic or fluid-operated cylinder 26 surmount the web 21 and are provided with a vertically extendable shaft 28 which can be actuated in the conventional manner by fluid pressure exerted within the hydraulic or fluid-operated cylinder 26. The shaft 28 extends through an aperture 29 formed in the web 21 of the arm 16. The lower end of the shaft 28 is provided with a radial ball bearing 30 which is housed in a collar 31a suitably secured, as by bolts 32 to the plug 15.

Although the embodiment of the invention herein described utilizes the above noted pressure-actuated means, it is to be understood that other lifting means such as a suitable counterbalance may also be employed.

The plug 15 can be raised above the pressure vessel 10 upon retraction of the shaft 28, in which position the plug can be swung laterally of the axis of the chamber 12, the arm 16 being rotatable upon the shaft 20. Thus, access can be had to the interior of the chamber 12.

The plug 15 is provided with a plurality of handles 31, whereby the plug 15 can be rotated on the ball bearing 30.

An important feature of the invention resides in the means for guiding the plug 15 into alignment with the vertical aperture located at the upper portion of the pressure vessel 10. As may be seen in FIGURE 3 of the drawings, this vertical aperture is defined by the internal thread 13. The marginal perimeter 33 of the vertical aperture is threadedly engaged with vertical shafts 34, each of which is engaged with a pair of radial ball bearings 35 of conventional design. As may be seen in FIGURE 2 of the drawings, three generally cylindrical rollers 36 depend from the ball bearings 35 and are spaced at equal angular intervals around the vertical aperture of the pressure vessel 10.

Figure 3:
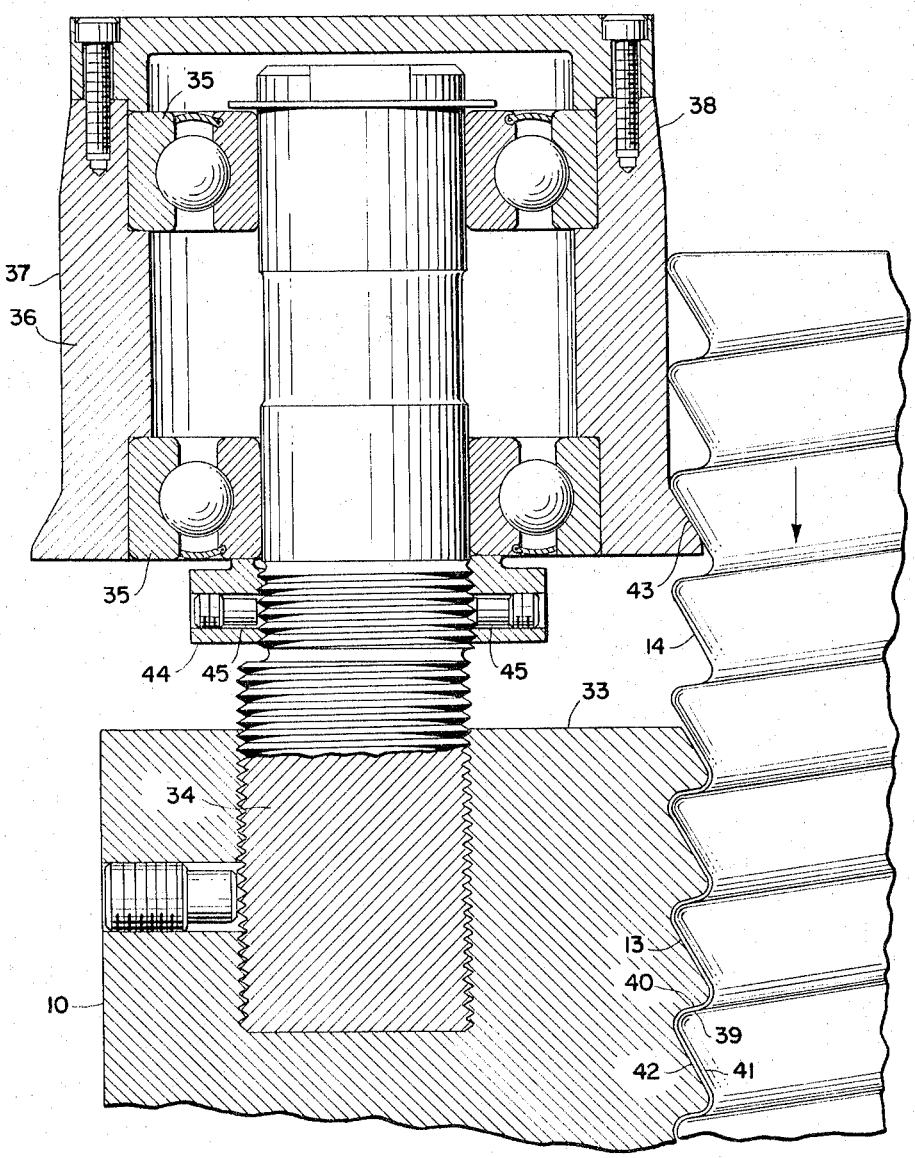
FIGURE 3 is an enlarged, fragmentary elevational view depicting one operative position of the plug and plug-guidance and supporting means employed in the aforesaid embodiment of the invention.

The upper peripheral portion 38 of each of the rollers 36 is flared or tapered, as shown in FIGURE 3, so as to accommodate the plug 15 inwardly of the rollers 36, as in the position of the plug 15 depicted in FIGURE 2. Each of the rollers 36 is provided with an intermediate peripheral portion 37, the outermost portion of the external thread 14 of the plug 15 being slidably contactable with such intermediate peripheral portion 37, in which position, the plug 15 is axially aligned with the vertical aperture of the pressure vessel 10.

It will be noted that the external thread 14 of the plug 15 and the internal thread 13 of the vertical aperture of the pressure vessel 10 are of equal pitch (as may be seen in FIGURE 3) and include elements 39, 40 disposed generally radially of the axes of the plug 15 and vertical aperture in which it is receivable.

Said threads 13, 14 also include elements 41, 42 which are inclined with respect to said axes.

As may be seen in FIGURE 3 of the drawings, each of the generally cylindrical rollers 36 is provided with a shoulder 43 at its lower portion. The inclined element 41 of the external thread 14 of the plug 15 is conformable with and surmounts the shoulder 43 of each of the generally cylindrical rollers 36, the shoulders 43 thereby supporting the plug 15 in spaced relation with respect to the vertical aperture of the pressure vessel 10, when the plug 15 is received in said vertical aperture, there being a clearance between said external and internal threads 13, 14. As may be seen in FIGURE 3 of the drawings, the vertical shaft 34 is threadedly engaged with a collar 44 which supports one of the radial ball bearings 35, thereby determining the elevation of the shoulder 43 with respect to the marginal perimeter 33 of the vertical aperture of the pressure vessel 10 and thus insuring the aforesaid spaced disposition of the external and internal threads 13, 14. The collar 44 may be affixed upon the shaft 34 by suitable socket screws 45.

With the foregoing arrangement, it will be seen that the rollers 36 can guide the plug 15 into a position where its external thread 14 surmounts the shoulders 43 of the rollers 36; and the plug 15 may be rotated by means of the handles 31 so as to be directed into the vertical aperture of the pressure vessel 10, the aforesaid spaced relation between the threads 13, 14 being continually maintained during such entry into said vertical aperture. In this connection, it will be noted that the plug 15 is supported by the shaft 28, as well as the shoulders 43 of the rollers 36; and that the spaced relation between the threads 13, 14 is maintained while the chamber 12 is in its unpressurized condition.

Thus, the plug 15 will encounter little or no frictional resistance during its entry into the vertical aperture of the pressure vessel 10 and hence, will not be subject to the risk of seizure, galling or injury to the threaded portions thereof which might otherwise arise. The same spaced relation between the threads 13, 14 will also be maintained during withdrawal of the plug 15 from said vertical aperture, the external thread 14 being superimposed upon the shoulder 43 at all times during entry and withdrawal of the plug from the vertical aperture of the pressure vessel.

The external and internal threads 13, 14 also function to accomplish closure of the chamber 12 when an internal pressure is created therein, as, for example, by reason of the exertion of a hydraulic pressure in the conventional manner for the purpose of bag-molding within the chamber 12.

Figure 4:
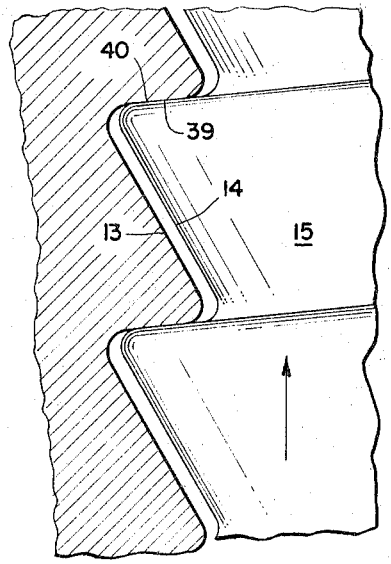
FIGURE 4 is an enlarged, fragmentary elevational view of another position of the plug employed in said embodiment of the invention.

Such closure may be seen in FIGURE 4 of the drawings which depicts a closed position of the internal thread 13 and external thread 14. Thus, when pressure is exerted within the chamber 12, the pressure will urge the plug 15 in the direction of the arrow depicted in FIGURE 4, thereby tending to bring the generally radially disposed elements 39, 40 of the internal and external threads 13, 14 into mating contact which effectively closes the chamber 12 and obstructs exit of the plug 15 during pressurization of said chamber 12. At the same time, such pressurization urges the external thread 14 to separate from the shoulder 43, thereby reducing any load thereon.

The pressurization within the chamber 12 may also be reduced, as when the molding operation is completed, thereby permitting the threads 13, 14 to return to their spaced position.

It will be seen from the foregoing, that the objects of the invention have been achieved in a simple and ingenious manner which may be accomplished efficiently and economically.

The embodiment of the invention illustrated and described hereinabove has been selected for the purpose of clearly setting forth the principles involved. It will be apparent however, that the present invention is susceptible to being modified in respect to details of construction combination and arrangement of parts which may be resorted to without departure from the spirit and scope of the invention as claimed.

I claim:

1. An improved closure means comprising in combination:
   (a) a threaded plug;
   (b) a pressure vessel provided with a threaded aperture;
   (c) means for disposing the plug adjacent to the aperture and into engagement with means for guiding the plug into axial alignment with the aperture;
   (d) the plug being receivable within the aperture upon axial alignment therewith;
   (e) said means for guiding the plug into axial alignment with the aperture being provided with rotatable means for engaging the thread upon the plug, thereby supporting the thread upon the plug in spaced relation with respect to the thread upon the periphery of the aperture during reception of the plug within the aperture;
   (f) the plug being urged into threaded engagement with the aperture when the plug is received therein and subjected to a pressure exerted within the pressure vessel.

2. In combination with a pressure vessel having a vertical aperture:
   (a) a threaded plug engageable with the vertical aperture;
   (b) a plurality of rollers disposed radially of said aperture;
   (c) the plug being embraceable by the rollers while engaging and disengaging the vertical aperture;
   (d) the rollers being engaged with the thread upon the plug, thereby supporting the plug during its said engagement and disengagement with the vertical aperture.

3. An improved closure means comprising in combination:
   (a) a threaded plug;

(b) a pressure vessel provided with a threaded aperture;
(c) means for disposing the plug adjacent to the aperture and into engagement with means for guiding the plug into axial alignment with the aperture;
(d) the plug being receivable within the aperture upon axial alignment therewith;
(e) said means for guiding the plug into axial alignment with the aperture being provided with rotatable means for engaging the thread upon the plug, thereby supporting the thread upon the plug in spaced relation with respect to the thread upon the periphery of the aperture during reception of the plug within the aperture;
(f) the plug being urged into threaded engagement with the aperture when the plug is received therein and subjected to a pressure exerted within the pressure vessel;
(g) said means for disposing the plug adjacent to the aperture and into engagement with means for guiding the plug into axial alignment with the aperture including:
 (i) an upright member adjacent to the pressure vessel;
 (ii) pressure-actuated means depending from the upright member;
 (iii) the plug being rotatably secured to said pressure-actuated means.

4. An improved closure means comprising in combination:
(a) a threaded plug;
(b) a pressure vessel provided with a threaded aperture;
(c) means for disposing the plug adjacent to the aperture and into engagement with means for guiding the plug into axial alignment with the aperture;
(d) the plug being receivable within the aperture upon axial alignment therewith;
(e) said means for guiding the plug into axial alignment with the aperture being provided with rotatable means for engaging the thread upon the plug, thereby supporting the thread upon the plug in spaced relation with respect to the thread upon periphery of the aperture during reception of the plug within the aperture;
(f) the plug being urged into threaded engagement with the aperture when the plug is received therein and subjected to a pressure exerted within the pressure vessel;
(g) said means for disposing the plug adjacent to the aperture and into engagement with means for guiding the plug into axial alignment with the aperture including:
 (i) an upright member adjacent to the pressure vessel;
 (ii) presure-actuated means depending from the upright member;
 (iii) the plug being rotatably secured to said pressure-actuated means;
 (iv) said pressure-actuated means including a hydraulic cylinder provided with a vertically extendable shaft;
 (v) said plug depending from said vertically extendable shaft.

5. A device according to claim 1, said means for guiding the plug into axial alignment with the aperture including:
(a) a plurality of generally cylindrical rollers depending from shaft means surmounting the aperture;
(b) the plug being slidably contactable with said generally cylindrical rollers during its axial alignment with the aperture;
(c) means for rotating the plug independently of said generally cylindrical rollers;
(d) said generally cylindrical rollers being rotatable by said plug when in contact therewith.

6. An improved closure means comprising in combination:
(a) a threaded plug;
(b) a pressure vessel provided with a threaded aperture;
(c) means for disposing the plug adjacent to the aperture and into engagement with means for guiding the plug into axial alignment with the aperture;
(d) the plug being receivable within the aperture upon axial alignment therewith;
(e) said means for guiding the plug into axial alignment with the aperture being provided with rotatable means for engaging the thread upon the plug, thereby supporting the thread upon the plug in spaced relation with respect to the thread upon the periphery of the aperture during reception of the plug within the aperture;
(f) the plug being urged into threaded engagement with the aperture when the plug is received therein and subjected to a pressure exerted within the pressure vessel;
(g) said means for guiding the plug into axial alignment with the aperture including:
 (i) at least three cylindrical rollers depending from shafts disposed axially parallel to said aperture;
 (ii) said shafts being disposed at equal angular intervals on the marginal perimeter of the aperture;
 (iii) one end of each said cylindrical roller being tapered to accommodate said plug inwardly of the cylindrical rollers;
 (iv) said rotatable means including a shoulder formed at the opposing end of each said cylindrical roller;
 (v) the threaded portion of the plug rotatably surmounting said shoulder during reception of the plug within the aperture;
 (vi) the plug being axially displaceable with respect to the aperture upon rotation of each said shoulder.

7. A device according to claim 1,
(a) the threads on said plug and aperture being defined by adjacent elements disposed generally transversely of the axes of said plug and aperture and by adjacent elements inclined with respect to said axes;
(b) said first mentioned adjacent elements mating upon threaded engagement of said plug with said aperture.

8. An improved closure means comprising in combination:
(a) cylindrical plug provided with an external thread;
(b) a pressure vessel having a vertical, circular aperture communicating with a pressure chamber within said pressure vessel;
(c) said circular aperture being provided with an internal thread;
(d) said external and internal threads having the same pitch;
(e) a vertical stanchion affixed to said pressure vessel and provided with a rotatable arm disposed above said circular aperture;
(f) a hydraulic cylinder surmounting the rotatable arm and having a vertically extendable shaft provided with rotatable bearing means;
(g) said cylindrical plug being affixed to said rotatable bearing means, thereby permitting rotation of said cylindrical plug;
(h) at least three vertical shafts disposed at equal angular intervals around said aperture and projecting from the marginal perimeter thereof;
(i) each of said vertical shafts being provided with bearing means engaged with the internal periphery of a hollow, generally cylindrical roller;

(j) the upper end of each generally cylindrical roller being tapered to accommodate said plug inwardly of the cylindrical rollers;

(k) the lower end of each generally cylindrical roller including an inclined shoulder;

(l) said generally cylindrical rollers including intermediate portions between the upper and lower ends thereof, said intermediate portions being contactable with the outermost portion of said external thread to align the plug axially with said aperture;

(m) the threads on said plug and aperture being defined by adjacent elements disposed generally transversely of the axes of said plug and aperture and by adjacent elements inclined with respect to said axes;

(n) said inclined shoulder being surmountable by and conforming with said inclined element of the thread of the plug;

(o) each said inclined shoulder cooperating with said inclined element of the thread of said plug to displace said plug axially of said aperture upon rotation of said generally cylindrical rollers, thereby permitting entry and withdrawal of said plug within said aperture;

(p) the thread of said plug being supportable by said inclined shoulders in spaced relation with respect to the thread of said aperture while said plug is within said aperture;

(q) said generally transversely disposed adjacent elements of the threads of the plug and aperture being urged into engagement when the plug is disposed within said aperture and subjected to a pressure exerted within said pressure chamber;

(r) said inclined element of the thread of the plug being urged into spaced relation with respect to said inclined shoulders when the plug is disposed within said aperture and subjected to a pressure exerted within said pressure chamber.

References Cited by the Examiner
UNITED STATES PATENTS 2,877,921   3/1959   Grim _____ 220—39

THERON E. CONDON, *Primary Examiner.*

G. T. HALL, *Assistant Examiner.*